United States Patent [19]

Aldridge et al.

[11] Patent Number: 5,164,354
[45] Date of Patent: Nov. 17, 1992

[54] SUPPORTED HYDROGENATION AND HYDROTREATING CATALYSTS

[75] Inventors: Clyde L. Aldridge; Kenneth L. Riley, both of Baton Rouge, La.

[73] Assignee: Exxon Research and Engineering Co., Florham Park, N.J.

[21] Appl. No.: 632,722

[22] Filed: Dec. 24, 1990

[51] Int. Cl.$^5$ ............... B01J 27/051; B01J 27/049; B01J 27/188; B01J 27/185
[52] U.S. Cl. ............... 502/220; 208/216 R; 208/254 H; 502/170; 502/210; 502/211; 502/221
[58] Field of Search ............... 502/211, 210, 220, 219, 502/174, 170, 221

[56] References Cited

U.S. PATENT DOCUMENTS

| | | | |
|---|---|---|---|
| 3,961,036 | 6/1976 | Hammer et al. | 502/231 |
| 4,016,106 | 4/1977 | Sawyer et al. | 502/258 |
| 4,504,589 | 3/1985 | Ryan | 502/254 |
| 4,965,236 | 10/1990 | Roberts | 502/211 |

Primary Examiner—Paul E. Konopka
Attorney, Agent, or Firm—Henry E. Naylor

[57] ABSTRACT

A catalyst composition having superior hydrotreating activity which catalyst is comprised of salts and/or complexes of Group VIII metals with Group VI metal heteropolyacids on an inorganic oxide support material, wherein the concentration of Group VIII metal ranges from about 2 to 20 wt. %, and the concentration of Group VI metal ranges from 5 to 50 wt. %, which percents are on support and which catalyst composition is substantially free of free water.

19 Claims, 1 Drawing Sheet

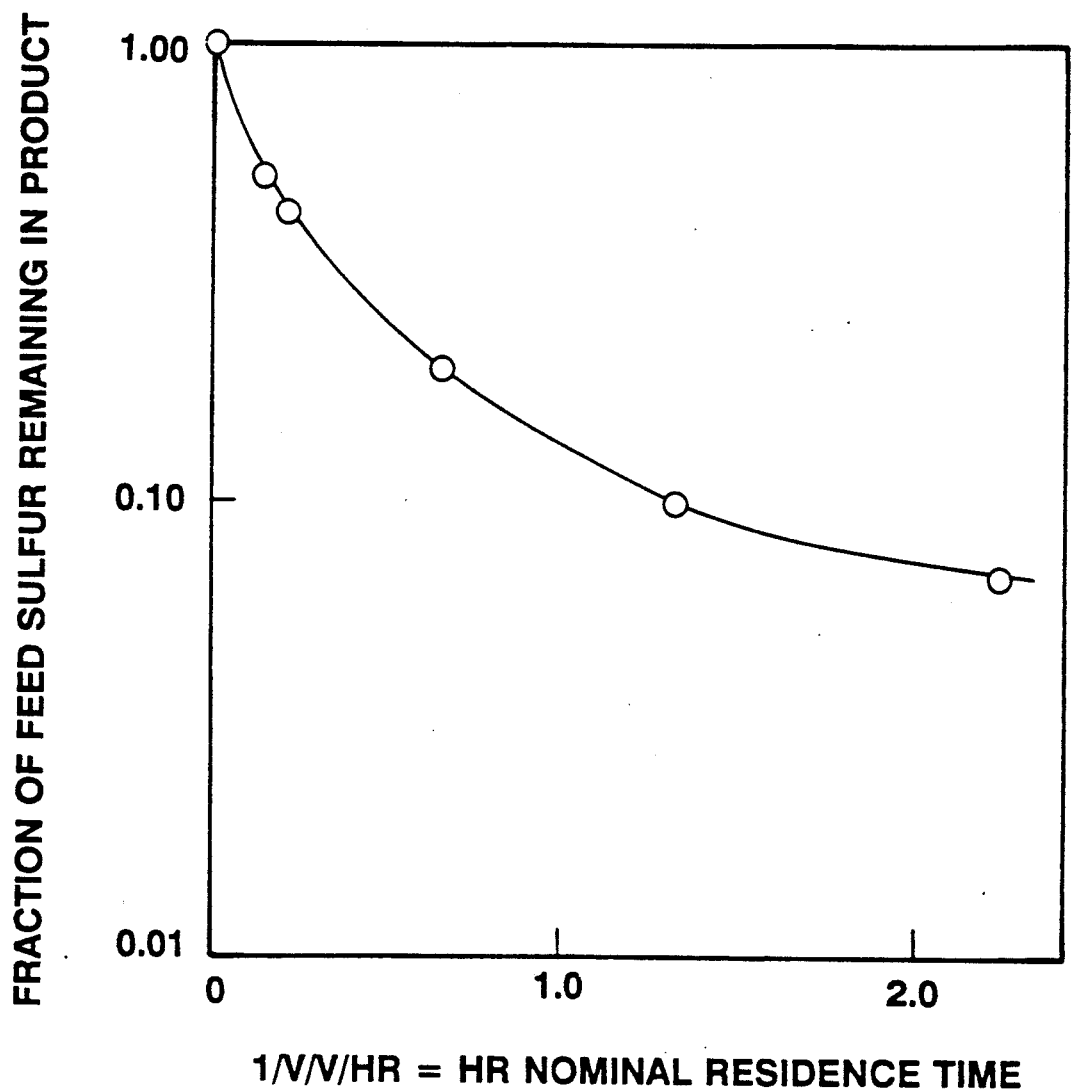

SUPPORTED HYDROGENATION AND HYDROTREATING CATALYSTS

FIELD OF THE INVENTION

The present invention relates to catalysts for heteroatom removal, particularly sulfur, from petroleum and synthetic fuel feedstocks. The catalyst is comprised of salts and/or complexes of a Group VIII metal with a Group VI metal heteropolyacid, on a refractory support. The present invention also relates to a method for preparing such catalysts wherein the Group VIII metal is impregnated onto the refractory support by use of a Group VIII metal salt of an acid and the Group VI metal is impregnated into the support by way of a Group VI heteropolyacid, wherein the acid comprising the salt of the Group VIII metal is less acidic than the heteropolyacid.

BACKGROUND OF THE INVENTION

Hydrotreating of petroleum feedstocks and various boiling fractions thereof has become increasingly important because of more stringent product quality requirements. For example, governmental regulations concerning allowed limits of sulfur in petroleum products, such as diesel fuel, become more limiting each year. Furthermore, the petroleum industry foresees the time when it will have to turn to relatively high boiling feeds derived from such materials as coal, tar sands, oil-shale, and heavy crudes. Feeds derived from such materials generally contain significantly more deleterious components, such as sulfur, nitrogen, oxygen, halides, and metals. Consequently, such feeds require a considerable amount of upgrading in order to reduce the content of such components, thereby making them more suitable for further processing, such as fluid catalytic cracking, catalytic reforming, etc.

Hydrotreating of hydrocarbonaceous feeds is well known in the art and usually requires treating the feed with hydrogen in the presence of a supported catalyst at hydrotreating conditions. The catalyst is typically comprised of a Group VI metal with one or more Group VIII metals as promoters on a refractory support. Hydrotreating catalysts which are particularly suitable for hydrodesulfurization or hydrodenitrogenation generally contain molybdenum or tungsten on alumina promoted with a metal such as cobalt, nickel, iron, or a combination thereof. Cobalt promoted molybdenum on alumina catalysts are most widely used for hydrodesulfurization, while nickel promoted molybdenum on alumina catalysts are the most widely used for hydrodenitrogenation.

Further, "Novel Hydrotreating Catalysts Prepared From Heteropolyanion Complexes Impregnated On Alumina", by A. M. Maitra and N. W. Cant, *Applied Catalysis*, 48 (1989) pp. 187-197, teaches hydrotreating catalysts prepared by impregnating alumina with solutions of heteropolyanions having the general structure $[H_wA_xB_yO_z]^{n-}$, where A may be Co or Ni, and B may be Mo or W. These catalysts were tested for hydrodesulfurization and hydrodenitrogenation activity and were found to be less active than a standard commercial hydrotreating catalyst.

While catalysts containing molybdenum with nickel, cobalt, or both, are in extensive commercial use today, they have limitations with respect to removing heteroatoms from heavy feeds, such as heavy coker gas oils and coal derived gas oils. As the feeds become heavier, the content of condensed aromatic hydrocarbons, with and without heteroatoms, increases. These condensed aromatics can absorb strongly on the catalyst sites reducing both the rate and extent of heteroatom removal. Consequently, there exists a need in the art for improved hydrotreating catalysts having increased activity toward such heavy feeds, particularly when the heteroatom to be removed is sulfur or nitrogen.

BRIEF DESCRIPTION OF THE FIGURE

The sole figure hereof shows the degree of desulfurization of a feed upon treatment with TN-8, a high activity commercial Mo-Ni-Co on alumina catalyst versus residence time.

SUMMARY OF THE INVENTION

In accordance with the present invention, there is provided a catalyst composition comprised of salts and/or complexes of a Group VIII metal with a Group VI metal heteropolyacid on an inorganic oxide support material, wherein the concentration of Group VIII metal ranges from about 2 to 20 wt. %, and the concentration of Group VI metal ranges from 5 to 50 wt. %, which percents are on support and which catalyst composition is substantially free of free water Also in accordance with the present invention is a method for preparing the catalyst compositions of the present invention by:

(a) impregnating an inorganic oxide support material with a Group VIII metal salt of an acid and with a Group VI heteropolyacid, wherein the acidity of the acid of the salt of the Group VIII metal is less than that of the Group VI heteropolyacid; and (b) drying the impregnated inorganic oxide support under conditions such that substantially all of the free water is driven off and salt and/or complex of the Group VIII metal salt and Group VI metal heteropolyacid results and is not decomposed during this drying step.

In one preferred embodiment of the present invention, the salt of the Group VIII metal is selected from acetates, formates, citrates, oxides, hydroxides, and carbonates.

In another preferred embodiment of the present invention, the heteropolyacid is a phosphomolybdic or phosphotungstic acid and the support is alumina.

In another preferred embodiment of the present invention, the catalyst is comprised of about 10 to 40 wt. % Mo, and 4 to 12 wt. % Ni and/or Co on an alumina support.

DETAILED DESCRIPTION OF THE INVENTION

A variety of feedstocks can be hydrotreated with the catalysts of the present invention, including hydrocarbonaceous fractions and whole feeds. Non-limiting examples of such feeds include organic solvents, light, middle and heavy petroleum distillates, as well as petroleum residual feeds. Other feedstocks include coal derived liquids, shale, oil, and heavy oils derived from tar sands.

In the practice of the present invention, a heteroatom containing feed, especially a sulfur and/or nitrogen containing feed, is contacted with hydrogen at hydrotreating conditions in the presence of a catalyst of the present invention. The catalyst is comprised of salts and/or complexes of Group VIII metal(s), preferably Co and/or Ni, more preferably Co; with at least one Group VI metal heteropolyacid, preferably Mo and W, more preferably Mo, on an inorganic oxide support, preferably alumina. The Group VIII metal is present in an amount ranging from about 2 to 20 wt. %, preferably from about 4 to 12 wt. %. Preferred Group VIII metals include Co, Ni, and Fe, with Co being most preferred. The preferred Group VI metal is Mo which is present in an amount ranging from about 5 to 50 wt. %, preferably from about 10 to 40 wt. %, and more preferably form about 20 to 30 wt. %. All metals weight percents are on support. By "on support" we mean that the percents are based on the weight of the support. For example, if the support were to weight 100 g, then 20 wt. % Group VIII metal would mean that 20 g. of Group VIII metal was on the support.

It is critical to the present invention that the Group VIII metal be incorporated into the support material by use of a Group VIII metal salt of an acid which has an acidity less than that of the Group VI heteropolyacid. If the acidity of the acid comprising the salt of the Group VIII metal is not less than the acidity of the heteropolyacid a catalyst complex will not form. Non-limiting examples of Group VIII metal salts of conjugate acids which are suitable for use herein includes acetates, formates, citrates, oxides, hydroxides, carbonates, and the like. Preferred are water soluble salts, more preferred are the water soluble acetates and formates, and most preferred are the acetates.

The Group VI metal is incorporated into the support by use of a heteropolyacid. Any suitable heteropolyacid may be used in the practice of the present invention, with the water soluble acids being preferred. A detailed description of heteropolyacids can be found in *Topics in Current Chemistry* 76, "Heteropoly Compounds of Molybdenum and Tungsten, by G. A. Tsigdinas, Springer-Verlag Berlin Heidelbery, 1978, which is incorporated herein by reference. Preferred are water soluble heteropolyacids, such as phosphomolybdic acid, phosphotungstic acid, silicomolybdic acid, and silicotungstic acid. Heteropolyacids soluble in organic solvents for catalyst impregnation may also be used. Non-limiting examples of such organic solvents include alcohols, such as the $C_1$-$C_8$ aliphatic alcohols, preferably methanol.

Any suitable inorganic oxide support material may be used for the catalyst of the present invention. Preferred are alumina and silica-alumina. More preferred is alumina. Other refractory inorganic compounds may also be used, non-limiting examples of which include zirconia, titania, magnesia, and the like. The alumina can be any of the aluminas conventionally used for hydrotreating catalyst. Such aluminas are generally porous amorphous alumina having an average pore size from about 50 to 200 Å, preferably from about 70 to 150 Å, and a surface area from about 50 to about 450 m$^2$/g, preferably from about 100 to 300 m$^2$/g.

It is also within the scope of the present invention to incorporate additional Group VI and Group VIII metals onto an existing conventional hydrotreating catalyst in order to raise the metals content to levels which in the conventional catalysts yield little or no additional activity as a result of such increased metals loading. Conventional hydrotreating catalysts typically contain about 0.5 to 5 wt. % Group VIII metal and about 3 to 18 wt. % Group VI metal on an inorganic oxide support, which is typically alumina. By practice of the present invention, the Group VIII metal content can be increased to 20 wt. % and the Group VI metal content can be increased to 50 wt. %, with accompanying increases in activity. The procedure for incorporating these additional metals on conventional hydrotreating catalysts is the same as incorporating the metals onto a fresh support. That is, the additional Group VIII metal is incorporated into the conventional hydrotreating catalyst by way of a salt of an acid and the additional Group VI metal by way of a heteropolyacid, wherein the acid comprising the Group VIII metal salt is less acidic than the heteropolyacid.

As stated above, alumina and alumina-silica supports are preferred. It is preferred that the support material of the present invention be surface modified with silica. It is also preferred when the support is an alumina-silica material it not contain more than about 35 wt. % silica.

The silica surface modifying agent is added to the support prior to incorporation of the catalytic metals. Any suitable silicon containing compound can be used as the source of silica. For example, preferred silica sources include tetraethylorthosilicate in a suitable organic solvent, such as a $C_1$-$C_8$ alcohol, preferably isopropyl alcohol. However, such sources as silanes, colloidal silica, silicon chlorides, or other organic silicon salts may also be used. Following impregnation with the silica source, the catalyst is dried at temperatures up to about 200° C. and calcined at temperatures ranging from about 300° C.–750° C., preferably from about 350° C. to 550° C. Calcination is effective in converting a silicon containing source to silica.

The amount of silica used to modify the surface of the support will be at least an effective amount. That is at least that amount which will enhance the activity of the catalyst for heteroatom removal, preferably at least that amount which will enhance the activity by at least about 5%, more preferably by at least about 10%. This amount of silica will generally be at least about 0.5 wt. %, preferably at least about 1 wt. % either as silica or a silica source. More preferably, silica additions should range from about 1 to 25 wt. %, most preferably from about 2 to 12 wt. %.

The Group VI and Group VIII metals can be incorporated into the support using any suitable technique, preferably by an incipient wetness technique, which is well known in the art. While it is preferred that a solution containing all of the metal salts be prepared and used to impregnate the support material in one or more impregnations, it is understood that each metal can be individually impregnated into the support in any order. For example, a solution of Group VIII salt of an acid can be used to impregnate the Group VIII metal into the support. The so impregnated support can than be dried and impregnated with the Group VI heteropolyacid. For economical purposes, it is preferred that one solution be used to impregnate all of the desired metals into the support simultaneously. Any suitable impregnation conditions may be used for the preparation of the catalysts of the present invention. Generally, such conditions will include treating the support material with the impregnation solution for an effective period of time, and at an effective temperature. By effective period of time we mean for at least that amount of time in which substantially all of the metal that will be impregnated into the support will be impregnated. Generally, this amount of time will range from about 1 minute to about 48 hours, preferably from about 10 minutes to about 30 hours. An effective temperature will generally be from about 15° C. to about 100° C., preferably from about 20° C. to about 75° C.

After impregnation and drying, a salt and/or complex of the Group VI metal(s) with the Group VIII metal(s) compounds is deposited on the support. It is critical to the present invention that this complex be maintained until sulfiding, especially during the drying step. Thus, drying conditions are maintained after impregnation which will not substantially decompose the salt and/or complex. Suitable drying conditions include drying the impregnated support under vacuum, up to the decomposition temperature of the salt and/or complex. The drying step drives off the free water so that the resulting catalyst composition is substantially free of free water. That is, free of water which is not chemically bound to the catalyst composition, such as by hydration. Because it is critical to maintain the salt and/or complex on the surface of the support prior to sulfiding, the impregnated support is not calcined prior to sulfiding.

Prior to use, the catalyst is sulfided under conventional sulfiding conditions. This sulfiding may be accomplished in situ, namely in the reactor. For example, the catalyst can be brought into contact with a sulfur-containing distillate in the presence of about 50 to 1,500 V/H/V of a hydrogen-containing gas under conditions including a temperature of about 75° C. to 450° C., a pressure (total pressure) of about 10 to 2500 psig, and a liquid hourly space velocity of about 0.3 to 2.0 V/H/V. After this sulfiding treatment, the sulfur-containing distillate is switched over to the feedstock to be treated, and the operation is restarted under operation conditions suitable for hydrotreating of the feedstock. In addition to the above process, use may be made of a process for effecting sulfiding comprising either bringing the catalyst into direct contact with hydrogen sulfide or other sulfur compounds, or by adding the sulfur compound to a suitable distillate and bringing the resulting distillate into contact with the catalyst. Suitable sulfur compounds, or sulfiding agents, which may be in the sulfur containing distillate include dimethyl disulfide, butyl mercaptan, dimethyl mercaptan, carbon disulfide, and the like.

Heteroatom removal conditions, especially hydrodesulfurization and hydrodenitrogenation conditions, will vary considerably depending on such things as the nature of the feed being treated, the nature of the nitrogen or sulfur being removed, the nature of the complexes being removed, the nature of the complexes employed, and the extent of conversion, if any, desired. In general, however, the following (Table A) are typical conditions for hydrodesulfurization/hydrodenitrogenation of a naphtha boiling within a range of about 25° C. to about 210° C., a diesel fuel boiling within a range from about 170° C. to 350° C., a heavy gas oil boiling within a range of from about 325° C. to about 475° C., a lube oil feed boiling within a range of from about 290° to 500° C., or residuum containing from about 10 percent to about 50 wt. % of material boiling above about 575° C. The catalysts of the present invention are not only superior for the hydrotreating of heteroatom-containing feedstocks, but they may also be used for the saturation of aromatic compounds.

TABLE A

| Feed | Temp., °C. | Pressure psig | Space Velocity V/V/Hr. | Hydrogen Gas Rate SCF/B |
|---|---|---|---|---|
| Naphtha | 100-370 | 50-800 | 0.5-10 | 100-2000 |
| Diesel | 200-400 | 100-1500 | 0.4-6 | 200-6000 |
| Heavy | 260-430 | 250-2500 | 0.3-4 | 500-6000 |
| Lube Oil | 200-450 | 100-3000 | 0.2-5 | 100-10,000 |
| Residuum | 340-450 | 500-5000 | 0.1-2 | 1000-10,000 |

The following examples are presented to illustrate the invention and should not be considered limiting in any way.

EXAMPLE I—CATALYST PREPARATION

Alumina

The alumina used for this example, as well as for the following examples, was a 14/35 mesh alumina having a surface area of 162 m$^2$/g. a pore volume of 0.682 cc./g., containing 7.12% water, a wet bulk density of 0.631 g./cc., and a dry bulk density was 0.5861 g./cc.

Impregnation Solution

A 44.0 cc. solution was prepared from 8.58 g. Co-(Ac)$_2$.4H$_2$O (23.66% Co), 17.59 g. of phosphomolybdic acid (48.7% Mo) and 31.32 g. demineralized water. The density of this solution was 1.3066 g./cc.

First Impregnation (17548-78)

A sample of the above alumina (31.61 g.) was impregnated with 28.09 g. of the impregnation solution. The stirred mixture was covered and allowed to stand 30 minutes after which it was uncovered and air-dried with stirring to remove 2.66 g. of water by evaporation. The dry-appearing solid was then dried in an oil pump vacuum oven at 160° C. for two hours to yield 38.94 g. of dry solid.

Second Impregnation (17548-79)

The product from the first impregnation was hydrated in open air to pick up 2.00 g. adsorbed moisture. This solid was then impregnated as described above with 23.52 g. of the impregnating solution and air-dried with stirring to remove 2.28 g. of water. The product was then dried in the vacuum oven for two hours at 160° C. to yield 46.19 g. of dry catalyst containing 6.21 wt. % Co, and 26.19 wt. % Mo, both on dry alumina.

EXAMPLE II—CATALYST TEST PROCEDURE

Reactor and Charge 40.0 cc. of 14/35 mesh catalyst was charged to a 29" long U-Tube reactor constructed of 18 gauge 304 stainless steel. The reactor was immersed in a sand bath and attached to piping connected to a feed pump and a hydrogen source on the inlet and to a Mity Mite pressure controller, a condenser and a wet test meter on the exit side. Hydrogen flow rate was controlled with a flow meter.

Catalyst Sulfiding Conditions

The sulfiding feed used in this example comprised 7.4 wt. % of dimethyl disulfide and 92.6 wt. % of petroleum distillate. The petroleum distillate contained 0.935 wt. % sulphur, 74 wppm nitrogen, 85.44 wt. % C and 13.32 wt. % H.

With the sand bath at 200° F., hydrogen flow was started at 0 minutes and pressure adjusted to 300 psig. Hydrogen gas flow was then adjusted to maintain an exit gas rate, as measured on the Wet Test meter, of 0.30 l./min. At 2 minutes sulfiding feed was started at the rate of 20 cc./min. At 5 minutes the feed rate was reduced to 1.0 cc./min. and heating of the sand bath started. At 65 minutes the sand bath temperature was 450° F. This temperature was held while maintaining the liquid and $H_2$ flow until 725 minutes.

At this point the sand bath temperature was raised to 650° F. over approximately 45 minutes (770 minutes) and the reaction maintained under these conditions to 1055 minutes.

At this time the pressure in the reactor was raised to 500 psig, the reactor was blocked off under pressure with valves that are on both the inlet and exit lines, all flows stopped, and the reactor disconnected, removed from the sand bath and plunged into ice water.

At this point the catalyst was sulfided and ready for testing.

Testing of Catalyst

Feedstock used for testing activity of catalyst was 600+° F. bottoms from light catalytic cycle oil containing 2.148 wt. % sulfur, 1437 ppm N., 89.13% C and 8.07% H.

The reactor containing the catalyst which was sulfided as described above and stored under pressure was immersed in the sand bath at 650° F., the lines connected to the inlet and exit systems and the valves opened. Feed was started at 1.5 cc./min. and $H_2$ at 0.45 l./min. as determined by the Wet Test meter on the exit line. Three liquid products were taken at 1 hour 20 minute intervals followed by three products at 40 minute intervals.

Product Workup

The liquid products were sprayed thoroughly with $N_2$ to remove all traces of $H_2S$ and analyzed for sulfur using a Philips PW1400 x-ray fluorescence spectrometer.

Activity Evaluation

Catalyst activity was determined by comparison with the performance of TN-8 sold by Akzo Catalysts. TN-8 is a NiCoMo on alumina hydrotreating catalyst having the following reported properties: apparent bulk density 590 kg/m$^3$; surface area 285 m$^2$/g; pore volume 0.53 ml/g; with the shape being quadralobe. TN-8 is a state of the art hydrodesulfurization catalyst which for purposes of these examples is assigned an activity of 100%.

The catalysts of these examples were rated vs. TN-8 on the basis of the reaction time required to reach a given degree of desulfurization in relation to that time required by TN-8. To do this, a calibration curve was prepared for TN-8 with the above-described feedstock and under the abovedescribed test conditions, but with feed rate (reaction time) varied widely (see attached FIG. 1). With this curve, a single test of an experimental catalyst suffices to assess its activity. Thus, if an experimental catalyst reaches a certain level of desulfurization in one-half the time required by TN-8, its activity would be 200%; or, if an experimental catalyst requires 1.5 times as long to reach the degree of desulfurization as does TN-8, the activity would be $1/1.5 \times 100 = 67\%$.

EXAMPLE III—(Run 251, 17643-68)

The Catalyst of Example I was evaluated according to the procedure of Example II and found to have 142% of the desulfurization activity of TN-8 catalyst. The degree of nitrogen removal was 25%.

EXAMPLE IV—(17794-75)

An impregnation mixture weighing 55.19 g. was made from 9.42 g. Co(formate)$_2$.2H$_2$O, 28.62 g. phosphomolybdic acid and 17.15 g. demineralized water. Alumina (63.11 g.), described in Example I except containing 7.44% adsorbed moisture and being in 1/16" extrudate form, was impregnated with the solution at room temperature (about 23° C.), allowed to stand overnight, then dried two hours in a 160° C. oil pump vacuum oven. The dried catalyst weighed 89.77 g.

This catalyst was cracked and screened to 14/35 mesh and tested (Run 366) according to the procedure of Example II. Desulfurization activity corresponding to 88% of TN-8 activity was found. The degree of nitrogen removal was 15%.

EXAMPLE V—(17794-47)

An impregnation mixture weighing 54.90 g. was made from 6.04 g of technical grade Co(OH)$_2$, 28.62 g. phosphomolybdic acid and 20.24 g. demineralized water. Alumina (63.19 g.), described in Example I except containing 7.57% adsorbed moisture and being in 1/16" extrudate form, was impregnated with the solution at room temperature, allowed to stand overnight, then dried two hours in a 160° C. oil pump vacuum oven. The dried catalyst weighed 87.07 g.

This catalyst was cracked and screened to 14/35 mesh and tested (Run 368) according to the procedure of Example II. Desulfurization activity corresponding to 91% of TN-8 activity was found. Nitrogen removal was 16%.

EXAMPLE VI—(17794-75)

An impregnation mixture weighing 57.53 g. was made from 2.06 g. of Ni(Ac)$_2$.4H$_2$O, 15.37 g. Co(Ac)$_2$.4H$_2$O, 28.62 g. phosphomolybdic acid and 11.48 g. demineralized water. Alumina (63.19 g.), described in Example I except containing 7.57% adsorbed moisture and being in 1/16" extrudate form, was impregnated with the solution at room temperature, allowed to stand overnight, then dried two hours in a 160° C. oil pump vacuum oven. The dried catalyst weighed 91.63 g.

This catalyst was cracked and screened to 14/35 mesh and tested (Run 370) according to the procedure of Example II. Desulfurization activity corresponding to 133% of TN-8 activity was found.

EXAMPLE VII

Alumina

The alumina used in this example was similar to that used in Example 1 hereof except that it had a surface area of 223 m$^2$/g and a pore volume of 0.7406 cc./g. and contained 8.79 wt. % moisture. This alumina was in the form of 1/20 in. quadralobe extrudate which was sized to 3 mm average length.

Silica Modified Support Preparation (17794-68)

A sample of 100 g. of the above alumina was impregnated with 10.894 g. of tetraethylorthosilicate diluted to 86 ml. with isopropyl alcohol and allowed to air dry overnight. The sample was then dried for 1 hr. in a 160° C. oil pump vacuum oven, followed by calcination in a furnace at 1000° F. for 1.5 hr. The recovered sample containing 3.44 wt. % SiO$_2$ (on dry Al$_2$O$_3$) weighed 93.33 g. The surface area was 228 m²/g and the pore volume was 0.685 cc/g. Before impregnation, this support was hydrated to 5.76 wt. % water content (on dry support plus water) by exposure to air.

Impregnation Solution

A solution was prepared by warming, for 15 minutes in a 57° C. water bath, 15.37 g. Co(Ac)$_2$ 4H$_2$O (23.66% Co), 28.62 wt. % phosphomolybdic acid (48.7% Mo) and 14.18 g. of dimeralized water.

Impregnation (17794-91)

The above described silica modified support (64.09 g.) was poured into solution in a glass stoppered erlenmeyer and the mixture shaken vigorously for 2 minutes whereupon all the solution was absorbed by the support leaving dry-appearing particles. After 10 minutes the flask was flushed with nitrogen and set aside at room temperature overnight (25 hr.). The solid was then dried in a 160° C. oil pump vacuum oven for 2 hours. The vacuum was broken with argon and the sample covered and allowed to cool to room temperature. The recovered catalyst weighed 91.59 g.

The recovered catalyst was crushed and screened to 14/35 mesh (Tyler screen size) for testing.

Determination of Activity of Catalyst (Run 367)

This catalyst was tested for activity according to the procedure of Example II hereof and found to have an activity for desulfurization of 153% of that of the comparative catalyst TN-8. The degree of nitrogen removal was 27%.

What is claimed is:

1. A method for preparing a catalyst composition suitable for removing heteroatoms from a heteroatom containing feedstock, which method comprises:
   (a) impregnating an inorganic oxide support material with a Group VIII metal salt of an acid and with a Group VI heteropolyacid, wherein the acidity of the acid of the salt of the Group VIII metal is less than that of the Group VI heteropolyacid composition selected from the group consisting of phosphomolybdic acid, phosphotungstic acid, silicomolybdic acid, and silicotungstic acid; and wherein the Group VIII metal is selected from the group consisting of Fe, Ni, and Co;
   (b) drying the impregnated inorganic oxide support under conditions such that substantially all of the free water is driven off and salt and/or complex of the Group VIII metal salt and Group VI metal heteropolyacid results and is substantially not decomposed during the drying step;
   (c) sulfiding the product from step (b) in a petroleum distillate in the presence of an effective amount of sulfiding agent and at a temperature of about 75° C. to 450° C.

2. The method of claim 1 wherein both the Group VIII and Group VI metals are impregnated from the same solution.

3. The method of claim 1 wherein the Group VIII metal is selected from Co and Ni and a mixture thereof.

4. The method of claim 3 wherein the acid comprising the salt of the Group VIII metal is selected from the group consisting of acetates, formates, citrates, oxides, hydroxides, and carbonates.

5. The method of claim 1 wherein the inorganic oxide support is selected from alumina, silica, and alumina-silica.

6. The method of claim 3 wherein the inorganic oxide support is selected from alumina, silica, and alumina-silica.

7. The method of claim 1 wherein about 4 to 12 wt. % Group VIII metal and from about 10 to 40 wt. % Group VI metal are used.

8. The method of claim 6 wherein about 4 to 12 wt. % Group VIII metal and from about 10 to 40 wt. % Group VI metal are used.

9. The method of claim 1 wherein prior to impregnation the inorganic oxide support is modified with silica.

10. The method of claim 8 wherein prior to impregnation the inorganic oxide support is modified with silica.

11. The method of claim 9 wherein the silica source is tetraethylorthosilicate.

12. The method of claim 10 wherein the silica source is tetraethylorthosilicate.

13. The catalyst composition prepared by the process of claim 1, wherein the concentration of group VIII metal ranges from about 4 to 12% and the concentration of group VI metal ranges form about 10 to 40% based on the support.

14. The catalyst composition of claim 13 wherein the surface of the support, prior to introduction of the metals, is modified with an effective amount of silica.

15. The catalyst composition of claim 14 wherein the surface of the support is modified with tetraethylorthosilicate as the silica source.

16. The catalyst composition of claim 15 wherein the Group VIII metal is selected from Co and Ni and a mixture thereof.

17. The catalyst composition of claim 13 wherein the Group VIII metal is selected from Co and Ni and a mixture thereof.

18. The catalyst composition of claim 13 wherein the inorganic oxide support is selected from alumina, silica, and alumina-silica.

19. The catalyst composition of claim 17 wherein the inorganic oxide support is selected from alumina, silica, and alumina-silica.

* * * * *